United States Patent
Ruiz et al.

(10) Patent No.: US 6,183,167 B1
(45) Date of Patent: Feb. 6, 2001

(54) PIPE PIER SYSTEM

(75) Inventors: Richard D. Ruiz, Des Peres; Thomas R. Knecht, Webster Groves; Robert J. McCann, O'Fallon; Troy D. Ruiz, St. Louis; Scott A. Ruiz, Kirkwood, all of MO (US); Joseph A. Parise, Granite City, IL (US); Stephen E. Schmidt, Hillsboro, MO (US)

(73) Assignee: Richard D. Ruiz, LLC, St. Louis, MO (US)

( * ) Notice: Under 35 U.S.C. 154(b), the term of this patent shall be extended for 0 days.

(21) Appl. No.: 09/231,136

(22) Filed: Jan. 15, 1999

(51) Int. Cl.[7] ............... E02D 5/08; F16B 7/00; F16B 7/10; F16D 1/12
(52) U.S. Cl. ............ 405/251; 405/230; 405/253; 405/255; 403/379.3
(58) Field of Search ............ 405/230, 231, 405/251, 253, 255; 403/378, 379.3

(56) References Cited

U.S. PATENT DOCUMENTS

| | | | | |
|---|---|---|---|---|
| 113,530 | * | 4/1871 | King ............... | 403/379.3 X |
| 214,545 | * | 4/1879 | Bacon ............... | 403/379.3 |
| 1,009,508 | * | 11/1911 | Guthrie ............... | 403/379.3 X |
| 2,350,582 | * | 6/1944 | Booth ............... | 403/379.3 |
| 3,353,852 | * | 11/1967 | Wood ............... | 403/379.3 X |
| 3,852,970 | | 12/1974 | Cassidy ............... | 405/230 |
| 3,924,413 | * | 12/1975 | Marsh, Jr. ............... | 405/251 |
| 4,254,597 | * | 3/1981 | Feldman et al. ............... | 405/251 |
| 4,547,096 | * | 10/1985 | Daigle et al. ............... | 405/251 |
| 4,708,528 | * | 11/1987 | Rippe ............... | 405/230 |
| 4,790,571 | * | 12/1988 | Montanari et al. ............... | 405/251 X |
| 4,925,345 | * | 5/1990 | McCown, Jr. et al. ............... | 405/232 |
| 5,234,287 | * | 8/1993 | Rippe, Jr. ............... | 405/230 |
| 5,515,655 | * | 5/1996 | Hoffmann ............... | 403/379.3 |

* cited by examiner

*Primary Examiner*—Eileen D. Lillis
*Assistant Examiner*—Tara L. Mayo
(74) *Attorney, Agent, or Firm*—Greensfelder, Hemker & Gale, P.C.

(57) ABSTRACT

A pipe pier system for use in supporting foundations is provided. The pier system is comprised of a plurality of pipe pier sections and pipe connecting insert members. The pipe sections are adapted to be butted end to end to each other in linear arrangement with the pipe connecting insert member being placed within and connected to respective ends of the butted pipe sections. The pipe sections and insert member have aligning holes to allow for a pin to span their diameters for a stable connection. A removable guide cap is provided for the terminal end of the pier assembly to reduce friction as the pier is driven into the ground.

8 Claims, 4 Drawing Sheets

PIPE PIER SYSTEM

BACKGROUND OF THE INVENTION

This invention relates to piering systems used in connection with the supporting of building foundations, footings and the like. In those types of applications, as is well known to those skilled in the art, piers are hydraulically driven or forced into the ground until they encounter a substrate sufficient to bear the load necessary to support the foundation or footing under which the pier is placed. When it is necessary to reach a substantial depth, multiple pier sections assembled in a linear arrangement must be employed.

Most of the pipe piers currently in use in the piering market today are comprised of pier sections that are not permanently affixed to one another. The pipe sections are fitted together in various ways, and in most instances, those methods are entirely satisfactory. However, under certain conditions, the manner in which the pipe sections are joined becomes critical. For instance, when the pier is being driven through a void, such as a mine or cavern, pier sections which rely on a continual axial compressive load as its means of connection may fall apart unless they are adequately connected together. Also, the connection point must be able to withstand the considerable compressive load placed thereon when the pier is being driven into the ground. Pier sections which are merely screwed or bolted together may collapse under extreme compressive loads. There further exist pier systems whose pipe sections butt up end to end with each other by using threaded ends; however, these are expensive to manufacture and can be time-consuming to install.

SUMMARY OF THE INVENTION

By means of the instant invention there is provided a pier system for use in supporting foundation and footing structures which enables easy and efficient end to end connection of pipe sections. This arrangement provides sufficient strength and stability to withstand both compressive and tensile loads, as well as moderate lateral forces. The pier system is comprised of a plurality of pipe sections which are adapted to fit end to end with an insert section placed in the respective pipe ends. The insert section has a diameter slightly less than the pipe sections which allows a telescoping fit of the pipe ends over the insert section. Holes are disposed on the pipe ends and insert section to allow for connective alignment. The holes allow for the connector to span across the pipe and insert for a more secure and stable connection. The holes are also dimensioned to accommodate a connector so that a tight press fit of the connector within the holes can be achieved. The pipe sections can be made to be uniform in that an insert section can be manufactured into one end of each pipe section so that only one connection between discrete pipe sections need be made in the field. The user can install as many pipe sections as is necessary to reach the depth needed to achieve the desired stable foundation support. The invention also allows the pier to be easily dissembled in the event of removal.

The pier system may also comprise a guide cap for placement over the terminal end of the pier to reduce friction on the pier as it is driven into the ground. The guide cap has a diameter larger than that of the pier. It is removable so that if the pier is extracted from the ground, the cap will become dislodged. Hence, the pier will be more easily pulled up through the larger diameter channel in the ground made by the guide cap.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
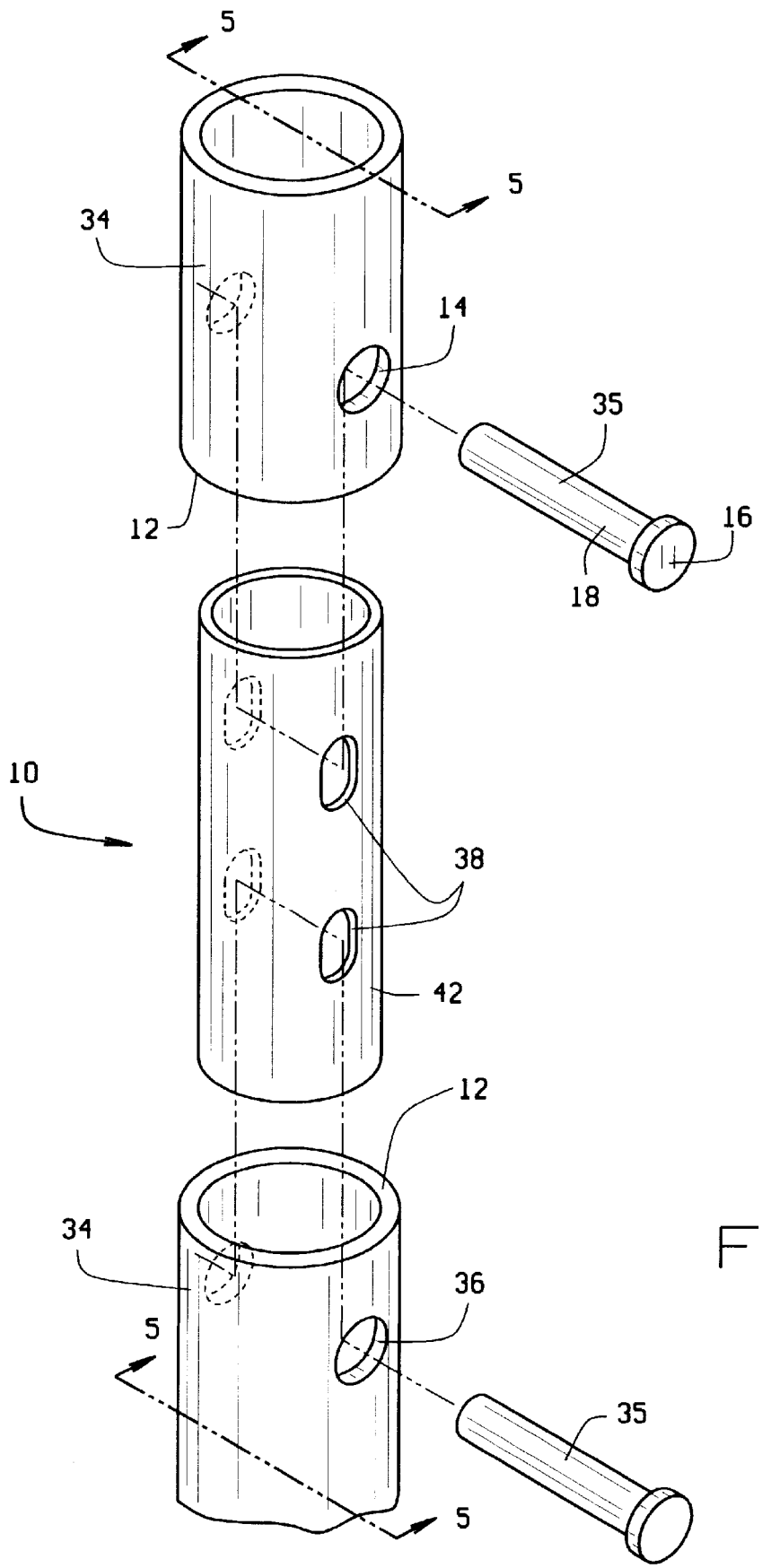
FIG. 1 is an exploded perspective view showing the insert section as it fits within the pipe ends.

The pipe tubing pier system of the instant invention is shown in FIG. 1 and is generally indicated by the reference numeral 10. It is comprised of pipe tube section members 34 and insert members 42. The pipe sections 34 are constructed of steel and come in various uniform lengths ranging from five to ten feet or longer as is well understood in the art. Insert member 42 is likewise constructed of steel and has a diameter slightly less than that of pipe sections 34, but should not be greater than that which would impede its passage within the pipe sections. Insert member 42 fits within pipe sections 34 in a telescoping manner so that a sufficient length is placed within each pipe section to allow connection therebetween and to also allow the respective pipe section ends 12 to butt up against each other as shown in FIG. 5.

Each end of the pipe sections has a pair of diametrically opposed apertures 14. Likewise, insert member 42 has two pairs of diametrically opposed holes 38, each pair being disposed towards the ends of insert member 42. The respective holes 38 of insert member 42 and apertures 14 of the pipe sections 34 are arranged such that they align with each other when the pipe sections are placed over the insert member as shown in FIG. 5. This allows a connector 35, such as a bolt or a pin, to be placed through the holes and apertures to span across the pipe section and insert member for a more secure and stable connection of the pier system.

Figure 5:
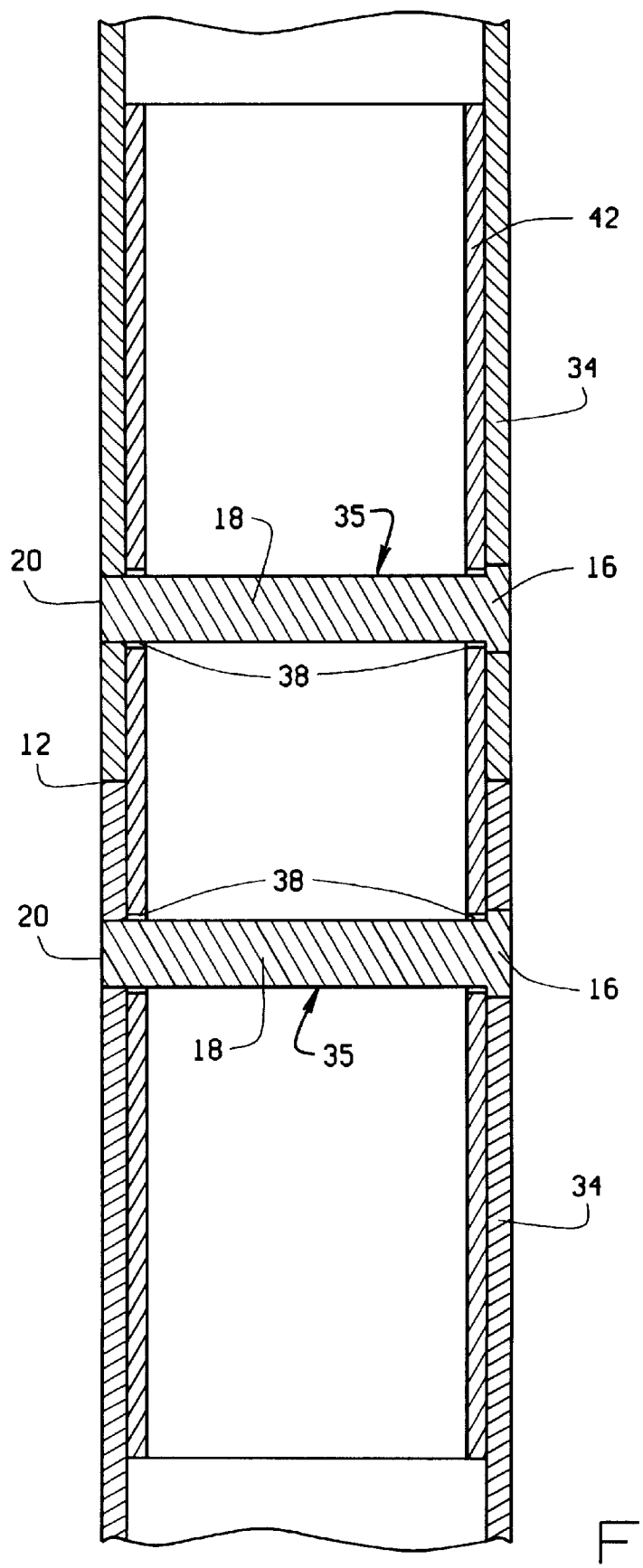
FIG. 5 is a cross sectional view in side elevation taken along lines 5—5 in FIG. 1 of the embodiment shown as connected together.

Holes 38 of insert member 42 are somewhat elongated, as shown in FIGS. 1 and 5, to form a slot running in the longitudinal direction of the insert shaft. The purpose for having slotted holes is to allow the ends 12 of pipe sections 34 to butt up against one another without connector 35 impeding the fit. Connector 35 will move slightly within the slot of hole 38 in relation to the displacement of connector 35 caused by the butting together of ends 12 of pipe sections 34. This relieves the connector 35 from being subject to the installation driving force placed on the pier and prevents connector 35 from shearing during the installation phase. Instead, the compressive force is limited to the interface between pipe ends 12. Holes 38 are not so long, however, that an excessive amount of longitudinal movement of pipe sections 34 in relation to insert member 42 can occur after connection.

To ensure a tight fit of connector 35 within pipe section 34 and insert member 42, apertures 14 of pipe sections 34 may be modified to accommodate a connector which comprises a bolt. As shown in FIGS. 1 and 5, bolt connector 35 has a head 16 and shaft 18. Aperture 36 on pipe section 34 is drilled to a dimension approximating that of bolt head 16 such that a press fit relationship between bolt head and aperture will exist. The diametrically opposed aperture 20 on the other side of pipe section 34 is drilled to have a dimension to receive bolt shaft 18. With this construction, the bolt is tapped into place and is tightly retained and secured. For removal, the bolt is easily tapped back out.

Figure 4:
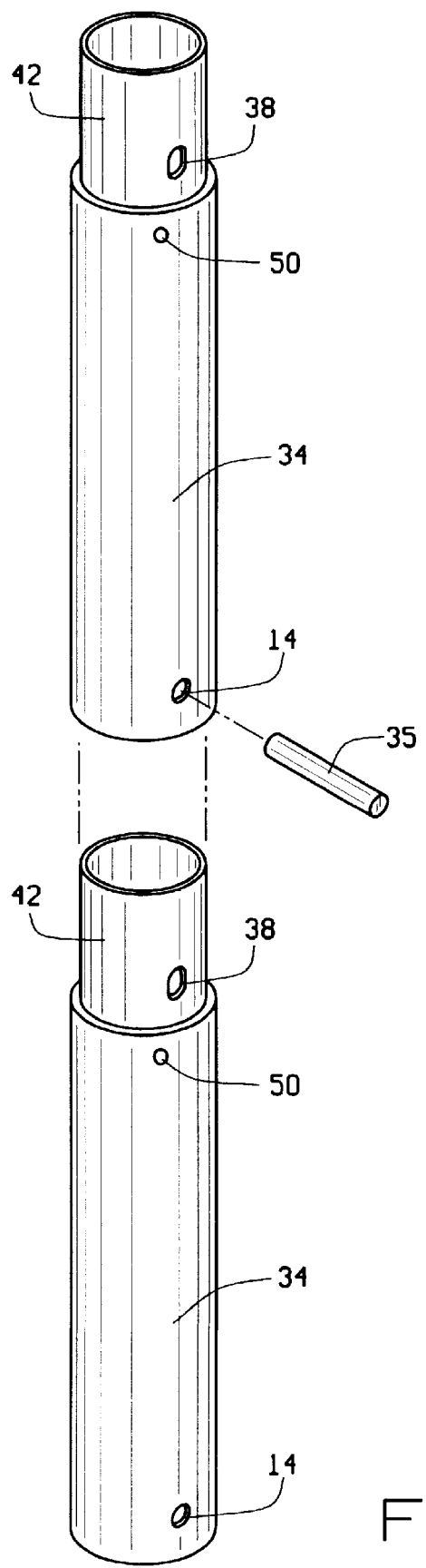
FIG. 4 is a perspective view of another embodiment of the pipe sections with integrated insert members.

For increased efficiency in the field, a pre-formed pipe section 34 with insert member 42 in one end may be provided as shown in FIG. 4. With this type of arrangement, the connection operation time of assembling the pier sections will be cut in half because one connection of insert member 42 between pairs of pipe sections 34 is already made. Insert 42 can be welded in place in pipe section 34 by weld 50 or by other means known to those skilled in the art, such as crimping, pinning or the like. The other end of pipe section 34 and the exposed end of insert member 42 are provided with their respective holes and apertures for connection in the manner as described above.

Figures 2, 3:
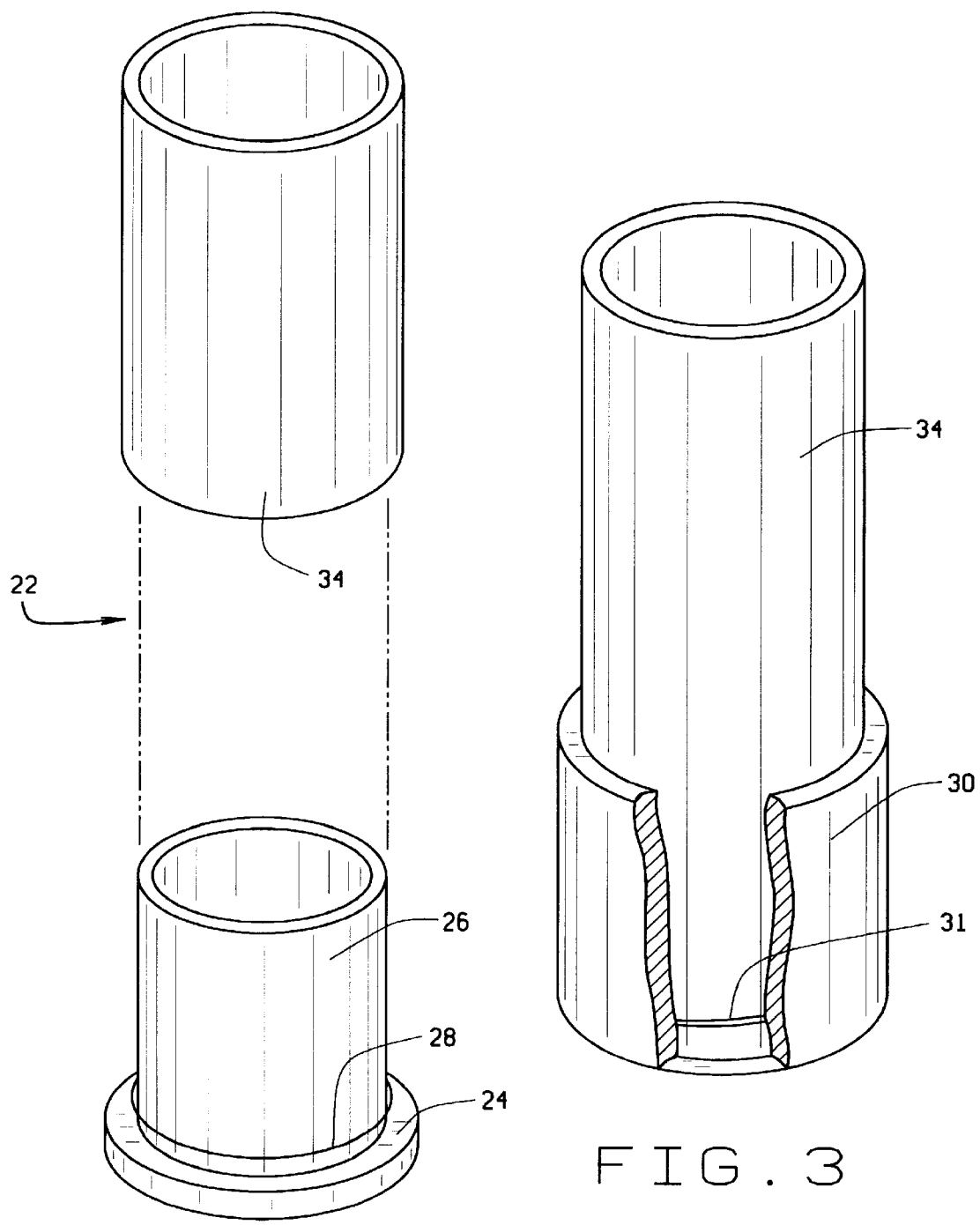
FIG. 2 is a perspective view showing an embodiment of the guide cap.
FIG. 3 is a perspective view showing a second embodiment of the guide cap, partially broken away.

The pier system also comprises a guide cap generally indicated by reference numeral 22 in FIG. 2. It is comprised of disk 24 attached to shaft 26. Shaft 26 is received within pipe section 34 and is the terminal end of the pier assembly. A circumferential rubber strip 28 is provided at the lower end of shaft 26 so that guide cap 22 is press fit within pipe section 34. Disk 24 has a diameter larger than pipe section 34 to reduce the friction along the sides of pipe sections 34 as the pier assembly is driven into the ground. Such friction would otherwise prevent the pier from reaching optimum load bearing strata. The larger diameter provided by guide cap 22 cuts a larger bore than the pier would create, and therefore the pipe section sides would not drag along the bore wall as greatly as if the bore were the same diameter of the pier. If the pier needs to be removed, guide cap 22 simply becomes dislodged and the pier can be pulled out. Another embodiment of the guide cap is shown in FIG. 3. It comprises a cap 30 which fits directly over the end of pipe section 34. A rubber strip 31 is placed around the end of pipe 34 to facilitate a press fit. A further advantage of the guide cap is that, by closing off the end of the pier pipe, it allows the pier assembly to become more effective as an end-bearing pier.

A preferred embodiment of the pipe pier system is described as follows. Pier section 34 is made from 3½ inch outside diameter structural steel tubing with 0.218 inch wall thickness. insert member 42 has a 3 inch outside diameter by 0.125 inch wall thickness with a minimum length of 12 inches. Insert member 42 is attached to pipe section 34 by connector 35 with 6 inches of the insert inside pipe section 34, and 6 inches outside the pipe section. Holes 38 are 0.5 inches in diameter and 0.75 inches in length and located 3 inches from the ends of insert member 42. First aperture 36 on pipe section 34 is 0.625 inches in diameter and second aperture 20 is 0.5 inches in diameter. Connector 35 is then inserted through the apertures and holes, starting from the 0.625" diameter aperture 36 on pipe section 34, then protruding through the 0.5" diameter holes 38 of insert member 42. Connector 35 is 3½ inches in length, 0.468 inches in diameter, and comes with a 0.625 inch diameter by 0.218 inch deep head. After the pin is inserted through the apertures and holes, its last 0.218 inch of travel is achieved by tapping with a hammer. The end result is a pin that is flush with the outside diameter of the pipe section, and is locked in place by the interference fit of bolt head 16 and pipe section aperture 36. Subsequent pipe sections are adjoined in like fashion. As a pipe section is joined to the preceding pipe section, it slides over the exposed insert section and its holes are aligned with those of the insert. As pier sections are joined together, the fixed insert member from one pipe section will protrude into the leading end of the next pipe section. Accordingly, the pipe sections will butt up against one another, and share a common insert. The initial pier section is first furnished with a 4 inch outside diameter by 0.250 inch thick disk 24 on guide cap 22.

The apparatus is advantageous in that it resists separation of pipe sections in situations where traditional pipe piers tend to separate, such as areas prone to seismic activity or when being installed through voids, mines, caverns or water structures. The apparatus is advantageous in that it strengthens the connection between piering sections and stabilizes sections when compressive forces are applied. The apparatus provides greater retrievability of pier sections, if required. The flush surface of the pier joints allows greater ease of installation.

Additionally, it is strongly believed that during periods of seismic activity, piering systems joined with permanently joined pipe sections will hold up due to the pier's potential for maintaining integrity when subjected to tensile loading. This seems especially true when compared to piers made with separable sections with inserts only that are not permanently fastened. If an insert is only 6 inches in length, a 3 inch upheaval is all that is needed to uncouple a piering system. The present invention is made with an insert that is not only 12 inches in overall length, but securely pinned to the pier sections.

Various changes and modifications may be made within this invention as will be apparent to those skilled in the art. Such changes and modifications are within the scope and teaching of this invention as defined in the claims appended hereto.

What is claimed is:

1. A pipe pier system comprising a plurality of pipe pier sections and at least one pipe connecting insert member, said pipe sections being adapted to be butted end to end to each other in linear arrangement, said at least one pipe connecting insert member being adapted to be placed within and connected to respective ends of said butted pipe sections, each of said pipe sections having apertures capable of being aligned with apertures in said at least one insert member for receiving a connector therebetween, a disposition of each said respective apertures of said pipe sections and said at least one insert member being such that said connector is capable of being spanned across said pipe section and said at least one insert member through said respective apertures, said apertures in said at least one insert member having a slot shape such that their dimension in an orientation running with a length of said at least one insert member is longer than a dimension of said apertures in said pipe sections running with a length of said pipe sections, whereby a shearing force on said connector is avoided.

2. The pipe pier system of claim 1 in which said apertures on said pipe sections each comprise first and second openings disposed on opposite sides of each said pipe section, said first opening having a larger diameter than said second opening, said connector comprising a bolt member having a head and an elongated shaft, said shaft having a diameter approximating that of said second opening, and said head having a diameter approximating that of said first opening, whereby said connector is received in said openings in a tight fit relationship.

3. A pipe pier system comprising a plurality of pipe sections, each of said pipe sections comprising an elongated pipe member and a pipe connecting insert member, said insert member having a first portion of its length being fixed within a first end of said pipe member and a second portion extending from said pipe member, said insert member having a diameter slightly less than a diameter of a second end of said pipe member, said extending portion of said insert member being adapted to be received within said second end of another pipe member, said pipe sections being thereby adapted to be butted end to end to each other in linear arrangement, said second end of said pipe members having apertures capable of being aligned with apertures in said second portion of said insert member for receiving a connector therebetween, a disposition of each said respective apertures of said pipe members and said insert member being such that said connector is capable of being spanned across each said pipe member and said insert member through said respective apertures, said apertures in said insert member having a slot shape such that their dimension in an orientation running with a length of said insert member is longer than a dimension of said apertures of each said pipe member running with a length of each said pipe member, whereby a shearing force on said connector is avoided.

4. The pipe pier system of claim 3 in which said apertures on each said pipe member comprise first and second openings disposed on opposite sides of each said pipe member, said first opening having a larger diameter than said second opening, said connector comprising a bolt member having a head and an elongated shaft, said shaft having a diameter approximately that of said second opening, and said head having a diameter approximating that of said first opening, whereby said connector is received in said openings in a tight fit relationship.

5. A pipe pier system comprising a plurality of connectable pipe sections and at least one pipe connecting insert member, said pipe sections being adapted to be butted end to end to each other in linear arrangement, said pipe connecting insert member being adapted to be placed within and connected to respective ends of said butted pipe sections, each of said pipe sections having apertures capable of being aligned with apertures in said insert member for receiving a connector therebetween, a disposition of each said respective apertures of said pipe sections and said insert member being such that said connector is capable of being spanned across said pipe section and said insert member through said respective apertures, said apertures in said insert member having a slot shape such that their dimension in an orientation running with a length of said insert member is longer than a dimension of said apertures of each said pipe section running with a length of each said pipe section, whereby a shearing force on said connector is avoided, said pipe pier system further having a removable end guide cap, said guide cap being adapted to fit on an end of a terminal pipe section, said guide cap having a diameter larger than said pipe section, whereby friction on said pipe sections from surrounding substrate is reduced as said pier system is driven into said substrate.

6. The pipe pier system of claim 5 in which said guide cap is mounted on a shaft, said shaft being removably connectable with said terminal pipe section.

7. The pipe pier system of claim 6 in which said shaft has a diameter less than said terminal pipe section, said shaft being capable of insertion within said terminal pipe section.

8. The pipe pier system of claim 6 in which said shaft has a diameter larger than said terminal pipe section, said shaft being capable of placement over said terminal pipe section.

* * * * *